UNITED STATES PATENT OFFICE.

MAX PLATSCH, OF FRANKFORT-ON-THE-MAIN, GERMANY.

PURIFYING SULFITE CELLULOSE LYE.

1,054,141. Specification of Letters Patent. Patented Feb. 25, 1913.

No Drawing. Application filed September 3, 1912. Serial No. 718,302.

*To all whom it may concern:*

Be it known that I, MAX PLATSCH, chemist and doctor of philosophy, a citizen of the German Empire, and resident of Frankfort-on-the-Main, Germany, (with the post-office address Bettinastrasse 3,) have invented new and useful Improvements in Purifying Sulfite Cellulose Lye, of which the following is a specification.

A difficulty in the utilization of the lye from sulfite cellulose has always been the high content of the lye in sulfur and lime components or constituents.

Attempts have been made to separate the lime compounds by clumsy methods of precipitation, and these compounds have been partially removed; such methods are however costly and the lyes generally have so many new components added that a dried crude lye containing about 15% of ash still contains 12% or more ash in the dried purified state. This ash which thus remains, in spite of the trouble and cost expended, is itself a great cause of inconvenience for many purposes, more especially owing to its components (sulfurous acid, sulfuric acid and their compounds). The attempt has been made to overcome this by diluting the incompletely purified lye by means of suitable resins and extracts of various kinds. But it is quite apparent that such a method is no solution of the problem but only a concealment of the actual facts.

Although during evaporation of the lye large quantities of lime compounds are continuously deposited (generally gypsum), so much sulfurous acid, acetic acid or the like escape that a concentrated lye, owing to this loss of weight in volatile constituents, after filtration still contains 11-12% of ash.

It has now been observed that the acetic acids, their derivatives and salts, contained in the lye, have a strong solvent action on the freshly precipitated gypsum. These acetic acids evaporate from the sulfite lye, but curiously enough not until this has attained a syrupy consistency. On this account it has appeared desirable to precipitate the lye only when highly concentrated, to approximately 35° Baumé, and when the essentially free volatile acids have evaporated. It has been proved that by adding to such thick lyes sulfuric acid or a suitable solid or dissolved salt thereof, the lime is very soon practically all precipitated as gypsum.

The content of ash in the dried lye amounts, for example, when aluminium sulfate is used as precipitant, to only about 6%, of which scarcely 1/5th was CaO, a proof that the power of the lye to dissolve gypsum had been very considerably diminished. This is a simple and cheap mode of purifying the lye and has never before been published. This far reaching precipitation occurs merely by varying the degree of solubility and can be effected, according to the purpose for which the lye is intended, with sulfuric acid or a suitable salt thereof. It is successful for example with aluminium salts, salts of magnesium, salts of zinc or salts of other bases; also with double salts or mixtures of salts, the acid radical of the salt forming with the lime an insoluble compound capable of being precipitated.

Precipitation of lime from the lye has already been effected by means of the salts of the alkalies (sodium sulfate or bisulfate and the like), but the fact has been overlooked that the liberated sulfurous acid for the greater part immediately combines with the alkalis, so that the purified commercial products thus obtained contain a large percentage of alkali sulfite.

By the present invention, only those salts are used, the bases of which form no compounds with sulfurous acid, or only easily decomposed compounds. For example when aluminium sulfate is used, the sulfurous acid leaves the lye freely, without combining with the alumina. The result is that in the purified lye sulfur compounds are almost completely absent and therefore also sulfites.

As regards the precipitation with sulfuric acid alone, it is known that on addition of sulfuric acid to sulfite cellulose lyes a part of the lime is separated as gypsum, sulfurous acid being liberated. That the lime could be completely separated from the lye with aid of sulfuric acid, has hitherto not been known.

It has further been observed that in precipitating sulfite cellulose lyes by sulfuric acid the lye assumes a dark color and is decomposed. By decomposition is here meant, that a sample evaporated to dryness on the water bath, no longer dissolves without a residue in water. In technical circles it has been discovered and also openly stated that precipitation with sulfuric acid is insufficient and that the decomposed lye cannot be used.

It has now been found that the sulfite lye can be completely freed from lime by means of sulfuric acid and neutralized ready for use, so that it is no longer decomposed in the sense defined above. It has indeed been shown that here again the acetic acid tends to dissolve the gypsum and so hinders the precipitation. If however care is taken when concentrating the sulfite lye that the acetic acid is evaporated, it is possible to precipitate completely the lime by means of sulfuric acid.

If a quantity of dilute sulfuric acid corresponding with the predetermined quantity of lime, is added to a sufficiently highly concentrated cold sulfite cellulose lye freed from acetic acid the lime is completely precipitated. If now to the dark lye filtered from the gypsum suitable bases are added in the cold, the dark liquor becomes lighter again.

In proportion as the bases are dissolved or the acids neutralized, the substance becomes more stable so that it can be heated without decomposition.

The lye has the advantage of being very poor in sulfur since all the sulfurous acid combined with the lime is removed. Moreover the content of ash is also very small.

Having thus described my invention and the best means I know of carrying the same into practical effect, I claim:—

1. Process for purifying lyes from the manufacture of sulfite cellulose, which process consists in first concentrating the lye to a thick syrupy consistency and until the acids of the acetic series are substantially removed and then precipitating the sulfur or lime components.

2. Process for purifying lyes from the manufacture of sulfite cellulose, which process consists in first concentrating the lye to a thick syrupy consistency and until the acids of the acetic series are substantially removed and then precipitating the lime in the form of sulfate.

3. Process for purifying lyes from the manufacture of sulfite cellulose, which process consists in first concentrating the lye to a thick syrupy consistency and until the acids of the acetic series are substantially removed and then precipitating the lime in the form of sulfate by adding the sulfate of a base which does not form a stable sulfite.

4. Process for purifying lyes from the manufacture of sulfite cellulose, which process consists in first concentrating the lye to a thick syrupy consistency and until the acids of the acetic series are substantially removed, then precipitating the lime in the form of sulfate by adding sulfuric acid, then removing the precipitated calcium sulfate and then neutralizing the lye.

In testimony, that I claim the foregoing as my invention, I have signed my name in presence of two witnesses, this 23rd day of August, 1912.

MAX PLATSCH.

Witnesses:
 CARL WEIHE,
 FRIEDRICH QUEHL.